United States Patent [19]
Cultrera

[11] 3,834,245
[45] Sept. 10, 1974

[54] EMERGENCY V-BELT FOR VEHICLES
[76] Inventor: Salvatore J. Cultrera, 1744 Silverwood Dr., San Jose, Calif. 95124
[22] Filed: Aug. 20, 1973
[21] Appl. No.: 390,143

[52] U.S. Cl. ............................................. 74/231 J
[51] Int. Cl. ............................................. F16g 1/00
[58] Field of Search .................................. 74/231 J

[56] References Cited
UNITED STATES PATENTS
3,788,156   1/1974   Jackson............................. 74/231 J FOREIGN PATENTS OR APPLICATIONS
684,469   4/1964   Canada .............................. 74/231 J Primary Examiner—Leonard H. Gerin
Attorney, Agent, or Firm—Robert K. Rhea

[57] ABSTRACT

An elongated strip of woven fabric material has a locking type buckle secured to one end thereof for adjustably engaging the other end of the strip when the strip is entrained around a plurality of V-belt type pulleys.

3 Claims, 5 Drawing Figures

PATENTED SEP 10 1974  3,834,245

3,834,245

EMERGENCY V-BELT FOR VEHICLES

BACKGROUND OF THE INVENTION

1. Field of the Invention

The present invention relates to vehicles and more particularly to an emergency replacement belt therefor.

Pulley driven V-belts driving the radiator cooling fan or other components of the vehicle frequently break at locations wherein a proper sized replacement V-belt is not available thereby disabling the vehicle until such replacement belt can be obtained. Such a situation sometimes occurs when traveling between remotely spaced Cities or on Holidays when service centers are not open.

2. Description of the prior art

I do not know of any patents disclosing an emergency V-belt replacement such as disclosed by this invention.

SUMMARY OF THE INVENTION

An elongated strand or strip of woven fabric material, such as Nylon webbing, capable of being folded over on itself and received within the V-groove of the V-belt type pulley on a vehicle engine is secured at one end portion to a locking-type buckle for adjustably engaging the other end portion of the strip. The length of the strip is such that it is greater the length of the longer of any one of a plurality of V-belts used by the vehicle so that the replacement belt can be entrained around a plurality of pulleys and secured by its buckle in driving relation with the excess length of the strip being cut off adjacent the buckle.

The principle object of this invention is to provide an emergency repair V-belt pulley drive for a vehicle.

DESCRIPTION OF THE PREFERRED EMBODIMENT

Figure 1:
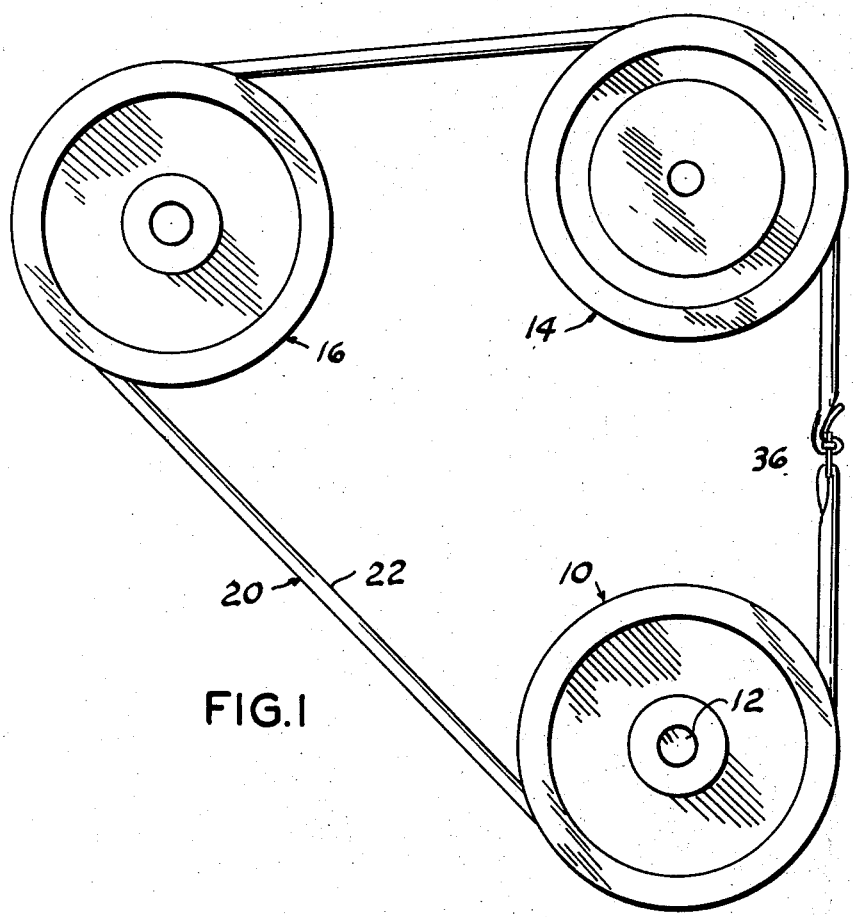
FIG. 1 is a side elevational view illustrating the emergency belt in operative position.
Figure 2:
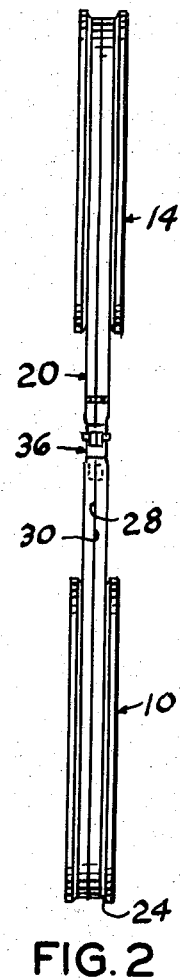
FIG. 2 is a right side elevational view of FIG. 1.

Like characters designate like parts in those figures of the drawings in which they occur.

In the drawings:

The reference numeral 10 indicates a V-belt drive pulley of the vehicle engine secured to a driving shaft, such as the crank shaft 12. The reference numerals 14 and 16 indicate other driven pulleys, such as the fan pulley and generator or alternator driving pulley being driven by the drive pulley 10 by an original equipment V-belt, not shown.

The reference numeral 20 indicates the emergency belt comprising an elongated strip 22, preferably of woven material, such as Nylon webbing, having a length greater than the length of the longest V-belt used by a vehicle. The width of the strip 22 is preferably greater than the width of a pulley V-belt groove 24 for the purposes presently explained.

Figures 3, 4:
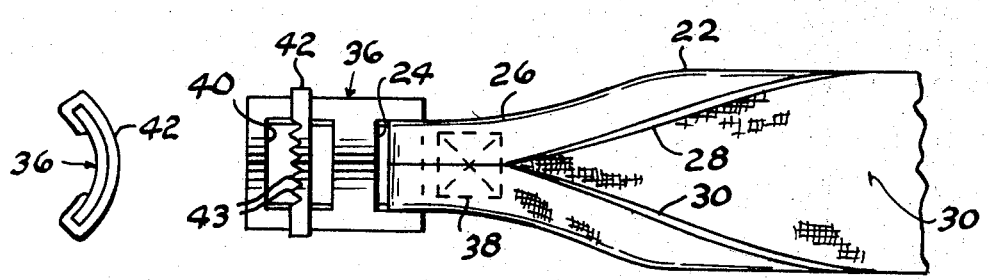
FIG. 3 is a plan view, to a larger scale, illustrating the emergency belt connected with a buckle-type connector.
FIG. 4 is a left end elevational view of the buckle as shown in FIG. 3.
Figure 5:
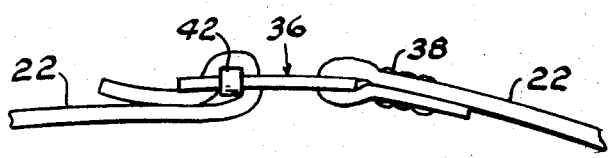
FIG. 5 is a side elevational view of the buckle connecting the opposite end portions of the emergency belt.

One end portion 26 of the strip has its marginal edges 28 and 30 folded over on its medial portion 32 and entrained through an opening 34 formed in a locking-type buckle 36. The strip is secured to the buckle as by stitching, indicated by the dotted lines 38. The buckle 36 is rectangular in plan view (FIG. 3) having a width permitting it to be nested between the converging walls forming the pulley groove 24. Lengthwise the buckle is slightly greater than its width. The end portion of the buckle 36, opposite its connection with the strip 22, is provided with an opening 40 transversely spanned by a bar 42 slidably supported by lateral marginal edge surfaces of the buckle. Intermediate its ends one lateral edge portion of the bar 42 is provided with a series of teeth 43 for gripping the strip 22 in the manner presently explained. The buckle 36 is longitudinally and transversely curved (FIGS. 4 and 5) for entering and partially conforming to the walls forming the pulley groove 24.

OPERATION

In operation the marginal edge portions 28 and 30 of the strip 22 are manually folded over on themselves in substantially abutting relaion and the strip is entrained around the pulleys 10, 14 and 16 with the overlapping marginal edges disposed outwardly and the buckle 36 disposed between any two of the three pulleys. The free end portion of the strip is inserted upwardly, as viewed in FIG. 5, through the buckle opening 40 between the bar 42 and the stitched end portion of the strip and then double back upon itself over the bar 42 and inserted downwardly through the other side of the bar 42 so that the teeth engage and grip the strip.

Obviously the strip 22 is pulled as taut as possible before the bar 42 grips the strip. The excess length of the strip 22 is simply cut off adjacent its connection with the buckle 36.

Obviously the invention is susceptible to changes or alterations without defeating its practicability, therefore, I do not wish to be confined to the preferred embodiment shown by the drawings and described herein.

I claim:

1. An emergency repair belt for a vehicle engine having a V-belt drive pulley and at least one V-belt driven pulley in face to face alignment with the drive pulley, comprising:

an elongated strip of woven fabric material having a length greater than the circumference of a V-belt normally entrained around said pulleys; and, elongated buckle means having a width cooperatively received between the walls forming the V of a V-belt pulley and having a closed loop in one end portion through which one end portion of said fabric strip is passed and secured in doubled back upon itself relation, the other end portion of said buckle means having an opening therethrough transversely spanned by a lock bar slidably secured to opposing side surfaces of said buckle means whereby said fabric strip may be tautly entrained around said pulleys and the other end of said fabric strip lockably threaded through the opening in said other end portion of said buckle means.

2. The repair belt according to claim 1 in which said buckle means is further characterized by being arcuately curved longitudinally and transversely for conforming to a circumferential arc of the respective V-belt pulley and inducing a laterally inward upon itself folding action of said fabric strip.

3. The repair belt according to claim 2 in which said lock bar is characterized by a series of laterally projecting teeth engageable with said fabric strip when the latter is threaded through the buckle means opening and over said lock bar.

* * * * *